(No Model.)
N. E. PORTER.
TOE WEIGHT.
No. 427,905. Patented May 13, 1890.
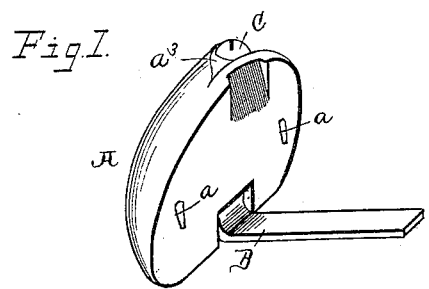
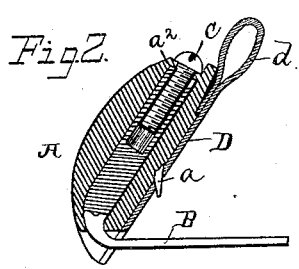
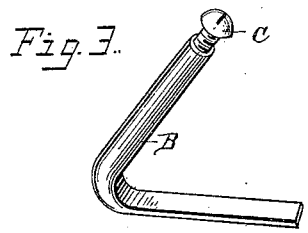
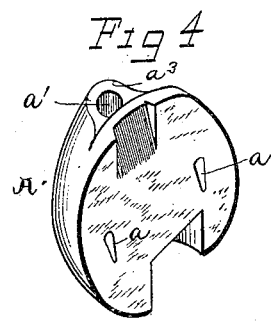
Witnesses
Wm. S. Hodges.
Robert Jenning
Inventor
Nelson E. Porter.
By his Attorney
J. W. Morris.

UNITED STATES PATENT OFFICE.

NELSON E. PORTER, OF TICONDEROGA, NEW YORK.

TOE-WEIGHT.

SPECIFICATION forming part of Letters Patent No. 427,905, dated May 13, 1890.

Application filed September 27, 1889. Serial No. 325,285. (No model.)

*To all whom it may concern:*

Be it known that I, NELSON E. PORTER, a citizen of the United States of America, residing at Ticonderoga, in the county of Essex and State of New York, have invented certain new and useful Improvements in Toe-Weights, of which the following is a specification, reference being had therein to the accompanying drawings.

This invention pertains to certain new and useful improvements in toe-weights, having for its object the production of a simple and effective toe-weight that can be readily and easily secured to or removed from a horse's hoof.

The invention comprises the detail construction, combination, and arrangement of parts, substantially as hereinafter fully set forth, and particularly pointed out in the claim.

In the accompanying drawings, Figure 1 is a view in perspective of my improved toe-weight. Fig. 2 is a vertical sectional view thereof. Fig. 3 is a detail perspective view of the securing bar or plate. Fig. 4 is a similar view of the weight proper.

Referring to the drawings, A designates the toe-weight proper, from the rear side of which project two or more inclined teeth or spurs $a$ $a$. In this weight A is formed a vertical hole or opening $a'$, having a shoulder $a^2$ near its upper end, which end opens onto an outer shouldered or flat portion $a^3$, as shown.

B is an angular bar or plate, the flat horizontal portion of which fits beneath a horse's hoof. The outer circular portion of this bar or plate is hollow and provided with an interior screw-thread. This circular portion of bar or plate B is extended into the hole or opening $a'$ of weight A and is firmly held therein by a screw C, screwed down into its hollow end after being passed through said hole or opening.

In practice the weight is applied to a horse's hoof by passing the flat portion of bar or plate B beneath said hoof and between the latter and the shoe, when one is worn, and then by turning screw C the teeth or spurs $a$ will firmly impinge against or enter the outer surface of the hoof and the weight will be firmly drawn into place. The screw, when turned its full extent, will be arrested as against further movement by having its head come into contact with the upper surface of the shouldered or flat portion $a^3$.

To loosen or remove my toe-weight from a horse's hoof, it is only necessary to turn the screw a few times, when the parts will be sufficiently loosened to enable them to be readily removed.

My invention thus constructed is extremely simple, cheap, and durable.

Between the toe-weight and the horse's hoof I can dispose a leather washer D, of the same shape as said weight, and from it projects a loop $d$, as shown, which loop serves as a handle in applying or removing the weight or suspending the latter from a hook when not in use.

I claim as my invention—

The herein-described improved toe-weight, consisting of the weight A, having a hole or opening extending longitudinally therethrough and provided with inclined spurs on its inner face, the angular bar or plate having a horizontal flat portion and a hollow circular portion fitting said hole or opening provided with an inner screw-thread, and the screw located in said hole or opening and engaging said thread, substantially as set forth.

In testimony whereof I affix my signature in presence of two witnesses.

NELSON E. PORTER.

Witnesses:
C. E. GIFFORD,
M. S. PECK.